US007107333B2

(12) United States Patent
Burbeck et al.

(10) Patent No.: US 7,107,333 B2
(45) Date of Patent: Sep. 12, 2006

(54) METHOD AND APPARATUS FOR PROCESSING WORKFLOW THROUGH A GATEWAY (75) Inventors: Stephen L. Burbeck, Cary, NC (US); Toufic Boubez, Apex, NC (US); James B. Casler, Apex, NC (US); Stephen G. Graham, Chapel Hill, NC (US); Steven M. Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 813 days.

(21) Appl. No.: 10/202,175

(22) Filed: Jul. 24, 2002

(65) Prior Publication Data
US 2004/0019630 A1 Jan. 29, 2004

(51) Int. Cl.
*G06F 15/173* (2006.01)
(52) U.S. Cl. .................. 709/223; 709/203; 709/225; 719/315
(58) Field of Classification Search ................ 709/223, 709/203, 217–219, 225–226; 719/315
See application file for complete search history.

(56) References Cited

U.S. PATENT DOCUMENTS

| 6,850,979 B1* | 2/2005 | Saulpaugh et al. ......... 709/225 |
| 2001/0029519 A1* | 10/2001 | Hallinan et al. ............ 709/104 |
| 2002/0040388 A1* | 4/2002 | Ternullo et al. ............ 709/219 |
| 2002/0069257 A1* | 6/2002 | Rigori et al. ............... 709/217 |
| 2002/0143819 A1* | 10/2002 | Han et al. ................... 707/513 |
| 2002/0161745 A1* | 10/2002 | Call ............................ 707/1 |
| 2002/0174238 A1* | 11/2002 | Sinn et al. .................. 709/229 |
| 2003/0023450 A1* | 1/2003 | Casati et al. ................ 705/1 |
| 2003/0126047 A1* | 7/2003 | Hollar et al. ................ 705/30 |

OTHER PUBLICATIONS

White Paper, "Ruple: A Loosely Coupled Architecture Ideal for the Internet", www.roguewave.com, Rogue Wave Software, Inc., pp. 1-21.

* cited by examiner

*Primary Examiner*—Philip B. Tran
(74) *Attorney, Agent, or Firm*—Yee & Associates, P.C.

(57) ABSTRACT

A method, apparatus, and computer instructions for managing the processing of a document. A set of services registered for use in processing a document received from a client is identified in which registration information for each service within the set of services provides input requirements. A service from the set of registered services is selected to form a selected service by comparing a current state of the document with the input requirements for each service within the set of registered services. Execution of the selected service on the document is initiated, wherein a state transition occurs to a new state, which becomes the current state of the document processing system. The document processing system state is comprised of a collection of information fragments (tuples) which represent the set of documents currently being processed and the state of each document currently being processed. The selecting step and the initiating step are repeated until a response is returned to the client. In response to a request to register a new service, the set of registered services provided for processing of the document is dynamically altered to include the new service.

34 Claims, 5 Drawing Sheets

METHOD AND APPARATUS FOR PROCESSING WORKFLOW THROUGH A GATEWAY

BACKGROUND OF THE INVENTION

1. Field of the Invention

The present invention relates generally to an improved data processing system, and in particular, to a method and apparatus for processing requests from clients. Still more particularly, the present invention provides a method and apparatus for processing documents received from clients using services associated with a gateway.

2. Background of the Invention

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

Many businesses initiate and execute business transactions over the Web. Many of these transactions involve the exchange of documents, such as Web pages or extensible markup language (XML) documents. For example, a client of a supplier may request goods by submitting an order contained in an XML document. When this document is received by the supplier, the document is processed to fill the order. A receipt and/or invoice may be returned as a response to the order. This receipt and/or invoice may be returned in an XML document to the client.

Currently, the workflow used in handling business transactions and other types of requests involves a process or workflow that is implemented within a server computer. This processor workflow is static. Changes to the workflow require redesigning of the program or process implementing the workflow. For example, a supplier may desire to selectively send invoices along with receipts to some clients while only sending receipts to other clients. If the workflow system currently sends receipts and invoices to all clients, the workflow system must be altered to allow for selective sending of invoices. Making such changes may be time consuming and complex depending on the architecture of the workflow implemented in the server.

Therefore, it would be advantageous to have an improved method, apparatus, and computer instructions for allowing dynamic changes to processes used to handle client requests.

SUMMARY OF THE INVENTION

The present invention provides a method, apparatus, and computer instructions for managing the processing of a document. A set of services registered for use in processing a document received from a client is identified in which registration information for each service within the set of services provides input requirements. A service from the set of registered services is selected to form a selected service by comparing a current state of the document with the input requirements for each service within the set of registered services. Execution of the selected service on the document is initiated, wherein a state transition occurs to a new state, which becomes the current state of the document processing system. The document processing system state is comprised of a collection of information fragments (tuples) which represent the set of documents currently being processed and the state of each document currently being processed. The selecting step and the initiating step are repeated until a response is returned to the client. In response to a request to register a new service, the set of registered services provided for processing of the document is dynamically altered to include the new service.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
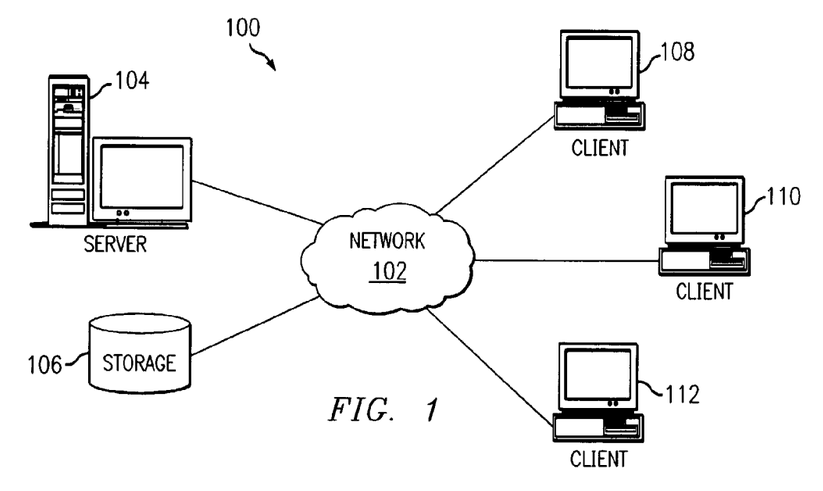
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. Specifically, these clients may send various requests, such as XML documents, to server 104. Server 104 processes these requests using services registered with the server. The mechanism of the present invention provides a dynamic workflow system, which may be implemented in a server, such as server 104, to allow different services to be substituted for services currently being used to process requests. In these examples, the services are business services used to perform various tasks, such as, for example, processing orders, generating invoices, debiting accounts, and returning responses or receipts. The mechanism of the present invention allows for the substitution of different services for performing various workflow tasks as well as allowing for new processing through modifying the order in which services are invoked or the conditions under which services are invoked.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
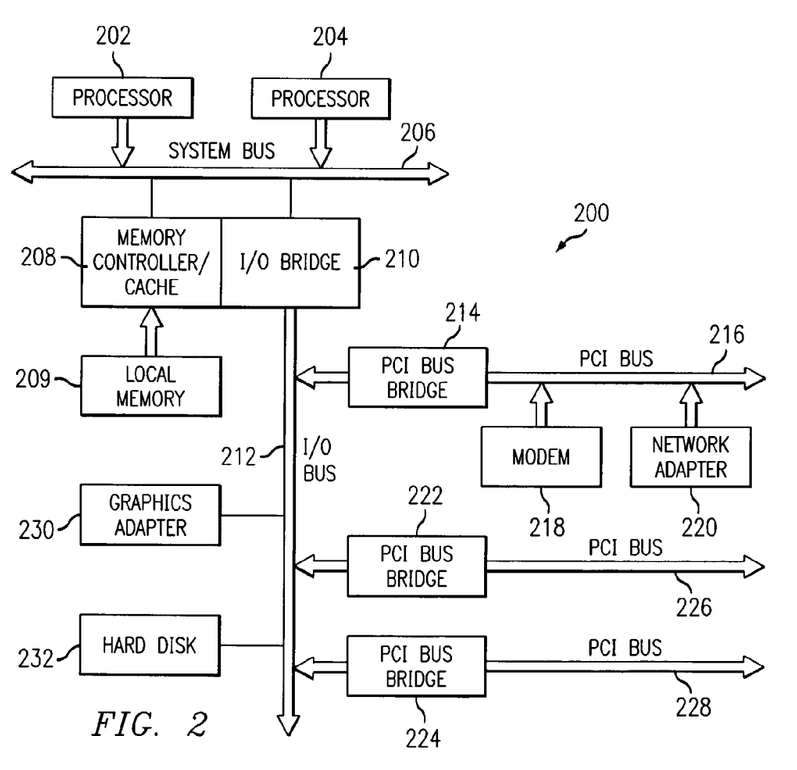
FIG. 2 is a block diagram of a data processing system that may be implemented as a server, in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. Input/output (I/O) bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
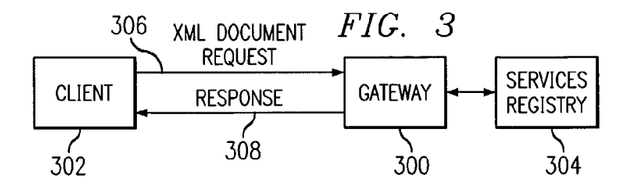
FIG. 3 is a diagram illustrating components used in performing processing of requests in accordance with a preferred embodiment of the present invention.

Turning next to FIG. 3, a diagram illustrating components used in performing processing of requests is depicted in accordance with a preferred embodiment of the present invention. In this example, gateway 300 provides a function, which may be implemented within a data processing system, such as server 104 in FIG. 1. Client 302 may be implemented with a client, such as client 108 in FIG. 1. Services registry 304 are services used for processing of requests received from clients, such as client 302. In these examples, the services are business services and may be furnished by one or more service providers. Services are usually application programs built using common programming technologies such as the Java programming language.

Services registry 304 is called by gateway 300 in response to the receipt of a request, such as XML document request 306 from client 302. The document is processed and response 308 is returned to client 302. The services used to process XML document request 306 depend on the content of XML document request 306 and the current state of the collection of services registered with the gateway. In accordance with a preferred embodiment of the present invention, a state is identified for XML document request 306 and processing occurs based on the identified state. When a service is called from services registry 304 based on an identified state, the XML document may be modified by the service. This modification results in a change in state for the XML document, which may result in other services being called based on the new state. The mechanism of the present invention allows for different services to be called by changing the services that are used for a particular state. The identification of services for use in processing XML document request 306 is based on services identified from services registry 304, which are registered with gateway 300. Services available for use are registered with gateway 300 in services registry 304.

Figure 4:
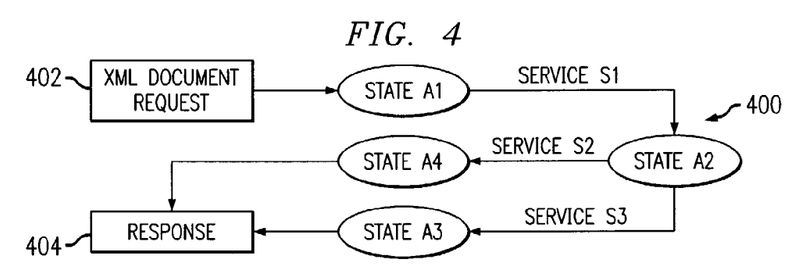
FIG. 4 is a state transition diagram of workflow implemented in a gateway in accordance with a preferred embodiment of the present invention.

Turning next to FIG. 4, a state transition diagram of workflow implemented in a gateway is depicted in accordance with a preferred embodiment of the present invention. State machine 400 may be implemented in a gateway, such as gateway 300 in FIG. 3, to process documents.

In this example, XML document request 402 is received for processing by state machine 400. State machine 400 includes states A1, A2, A3, and A4. Services S1, S2, and S3 are used to transition between states within state machine 400. These services are services registered with the gateway in these examples. When a client posts XML document request 402 to the gateway, this document is in state A1. Service S1 is identified as the service to initiate for state A1. This initiation of service S1 occurs because the description of this service has been published or registered with the gateway. The description of service S1 includes input requirements matching the type of XML document or patterns of content of the XML document as represented, for example, by a collection of XPath expressions, represented in state A1. XPath is a language for addressing parts of an XML document, designed to be used by both XSLT and XPointer. XPath provides a common syntax and semantics for functionality shared between XSL transformations (XSLT) and XPointer (XPointer). XSLT is a language for transforming XML documents into other XML documents. XSLT is designed for use as part of XSL, which is a stylesheet language for XML. In addition to XSLT, XSL includes an XML vocabulary for specifying formatting. XSL specifies the styling of an XML document by using XSLT to describe how the document is transformed into another XML document that uses the formatting vocabulary. XML pointer language (XPointer) is a language used as the basis for a fragment identifier for any URI reference that locates a resource whose Internet media type is one of text/XML, application/XML, text/XML-external-parsed-entity, or application/XML-external-parsed-entity. XPointer, which is based on the XML path language (XPath), supports addressing into the internal structures of XML documents. XPointer allows for examination of a hierarchical document structure and choice of its internal parts based on various properties, such as element types, attribute values, character content, and relative position. An XPath expression is a unit of the XPath language used to specify a condition or pattern within an XML document or collection of XML documents.

Service S1 processes XML document request 402 and executes business logic or other processes resulting in one or more changes to XML document request 402 placing this document in state A2. Depending on the content of XML document request 402 after being processed by service S1, service S2 or service S3 may be triggered. The identification of the service to trigger or initiate is based on input requirements of the service description for service S2 and service S3. The service triggered to process XML document request 402 executes business logic or other processes, which result in an additional change to XML document request 402. After one of these services has been triggered, state machine 400 transitions to state A3 or A4. Thereafter, response 404 is returned to the client. This response may include, for example, an error condition or a response document, such as the modified XML document or a new XML document.

The different services used in the workflow in state machine 400 may be altered declaratively and dynamically in accordance with a preferred embodiment of the present invention. For example, service S1 may be an order process service. Several providers may provide alternative versions of this type of service allowing for alternative processing when an XML document enters a given state, which initiates or invokes service S1. These different alternative services may be published or registered with the gateway and the particular service invoked may depend on the content within XML document request 402 or on other factors external to XML document request 402. For example, if XML document request 402 specifies a selected number of items being ordered, the particular type of process service for processing orders may depend on the number of items ordered. Alternatively, a different order process service may be invoked depending on the particular date or time the order is received.

Additional services may be registered with the gateway to add additional alternatives for processing within a particular state. Additionally, services may be removed or unregistered from the gateway to eliminate those alternatives. The services registered with the gateway are opaque to the client submitting the request. By publishing or unpublishing services, the workflow executed in response to receiving a request, such as an XML document, may be dynamically altered easily and quickly.

Figure 5:
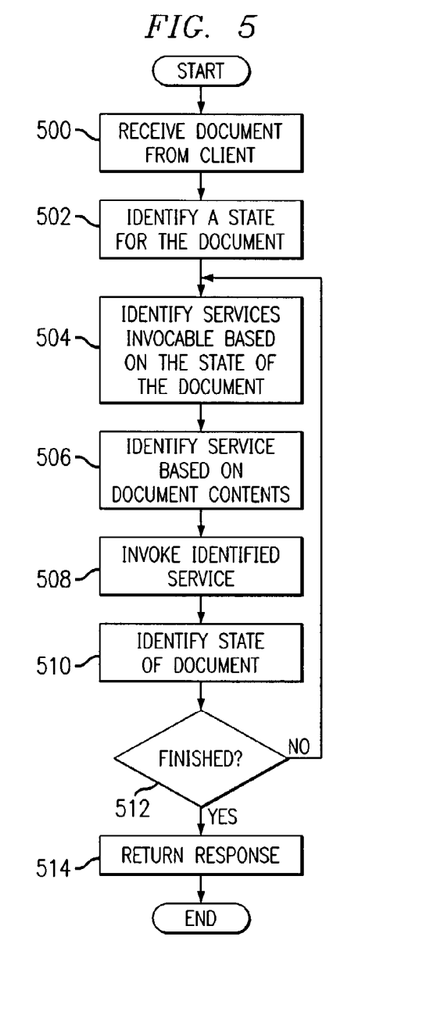
FIG. 5 is a flowchart of a process used for processing a request received from a client in accordance with a preferred embodiment of the present invention.

With reference now to FIG. 5, a flowchart of a process used for processing a request received from a client is depicted in accordance with a preferred embodiment of the present invention. The process illustrated in FIG. 5 may be implemented in a gateway, such as gateway 300 in FIG. 3.

The process begins by receiving a document from the client (step 500). In this example, the document is an XML document. A state is identified for the document (step 502). Then, services that are invocable based on the state of the document are identified (step 504). A particular service is identified based on the document contents (step 506). Step 506 involves comparing the input requirements for the services with the contents or data within the document. The identified service is invoked (step 508). The service will execute business logic or some other type of process, which alters the document.

Then, the state of the document is identified (step 510). A determination is then made as to whether the state indicates that the process has completed (step 512). If the process is completed or finished, then a response is returned (step 514)

and the process terminates thereafter. Otherwise, the process returns to step 504 as described above.

Figure 6:
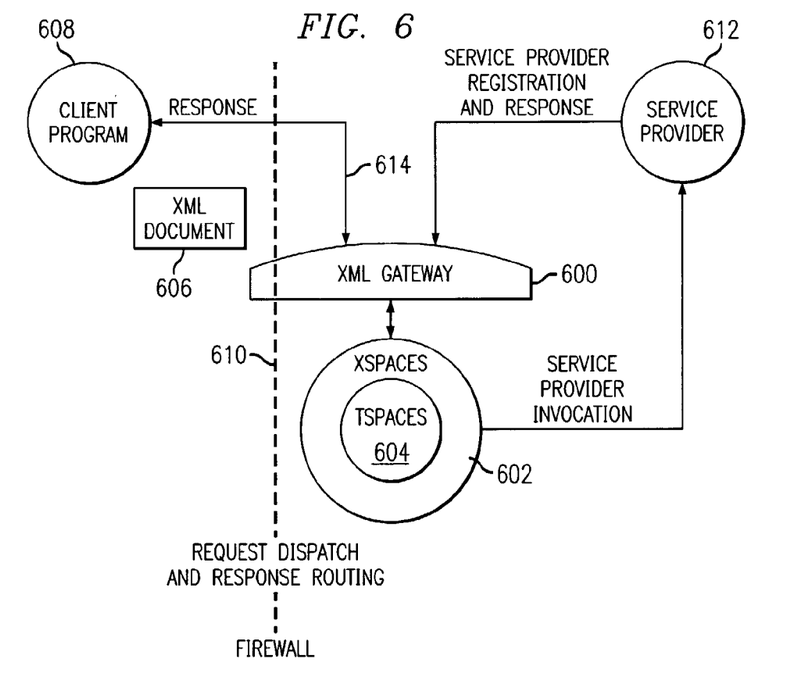
FIG. 6 is a diagram illustrating components in a gateway in accordance with a preferred embodiment of the present invention.

Turning next to FIG. 6, a diagram illustrating components in a gateway is depicted in accordance with a preferred embodiment of the present invention. In this example, a gateway, such as gateway 300 in FIG. 3, includes XML gateway 600, XSpaces 602, and TSpaces 604.

A request, such as XML document 606, is received from client program 608 over an HTTP/Post from client program 608. XML document 606 is posted to XML gateway 600 in this manner. This post is sent across firewall 610 in these examples.

XML gateway 600 collaborates with XSpaces 602 to wrapper or place XML document 606 into a routable message. XSpaces 602 dispatches the incoming XML document 606 to the appropriate back end system, such as service provider 612, for processing. The back end system responds either to the client directly or to XSpaces 602. The XSpaces server routes response 614 back to the client through the XML Gateway, possibly transcoding the result into the format required by the client. In this example, response 614 is sent in the form of an HTTP/Post of an XML document response.

In these examples, XML gateway 600 is responsible for providing services invoked by XML messages or documents over HTTP. XSpaces 602 is responsible for providing an XML based application program interface (API) over TSpaces 604. In other words, XSpaces 602 formats or places a wrapper around an XML document to allow the document to be sent to a service provider, such as service provider 612. TSpaces 604 is responsible for tuple manipulation, in-memory database and asynchronous, data-driven event communications. TSpaces 604 provides the process and functionality to identify the state of an XML document and to match the XML document with an appropriate service based on the state of the document. This functionality is provided by wrapping the document as tuples with a pattern matching process and notification mechanism. The data structure used to track the state of documents is a simple tuple, which is, in these examples, an ordered collection of arbitrary Java objects. The actual process of matching is described in more detail in FIG. 7 below.

These components form an API which may be used to provide access to various services. Service provider 612 in these examples uses HTTP to post its service registration to the gateway. Additionally, services use XML documents as an input to trigger or initiate the business logic or other processes provided by service provider 612. Further, service provider 612 returns the results by responding with an XML document. In these examples, the XML document is a modified form of the XML document received from the gateway, but may be an entirely new document depending on the particular implementation.

Figure 7:
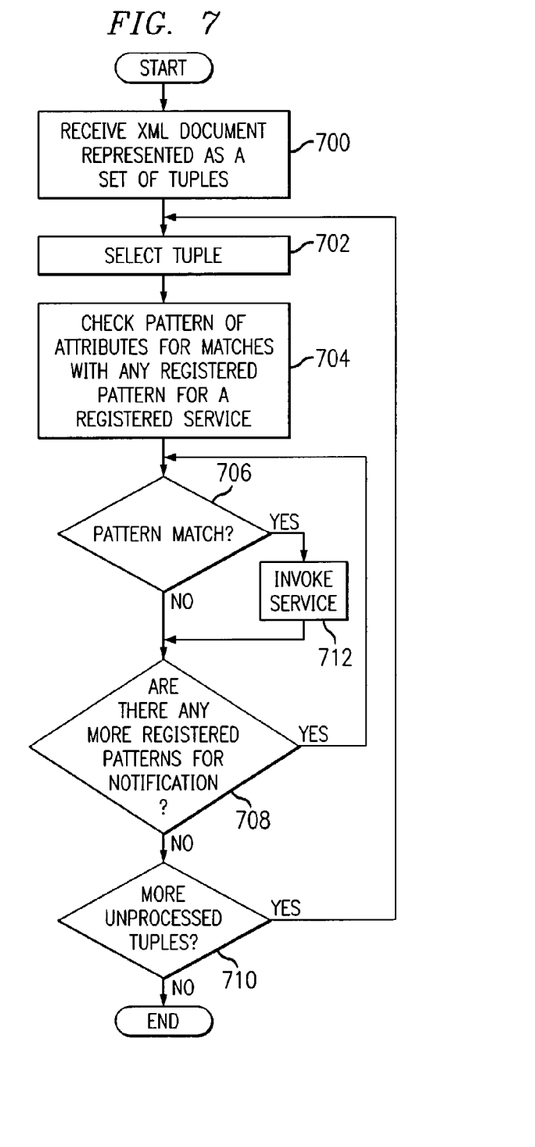
FIG. 7 is a flowchart of a process used for identifying the state of an XML document and matching the XML document with an appropriate service based on the state of the document in accordance with a preferred embodiment of the present invention.

Turning now to FIG. 7, a flowchart of a process used for identifying the state of an XML document and matching the XML document with an appropriate service based on the state of the document is depicted in accordance with a preferred embodiment of the present invention. The process illustrated in FIG. 7 may be implemented within TSpaces 604 in FIG. 6 to match documents with services.

The process begins by receiving an XML document represented as a set of tuples (step 700). The tuple from the set of tuples is selected for processing (step 702). A check is made to determine whether the pattern of attributes in the tuple matches any registered pattern for a registered service (step 704). Attributes that may be compared are the values of any XML element (such as purchase order number) that appear as an element within the tuple. A determination is made as to whether a pattern match is present (step 706). If a pattern match is not present, a determination is made as to whether additional registered patterns for notification are present (step 708). If additional registered patterns are present, the process returns to step 706. If additional registered patterns are not present, a determination is made as to whether additional unprocessed tuples are present (step 710). If additional unprocessed tuples are present, the process returns to step 702 as described above. Otherwise, the process terminates.

With reference again to step 706, if a pattern match is present, the service identified by the pattern match is invoked (step 712) with the process then proceeding to step 708 as described above.

Figure 8:
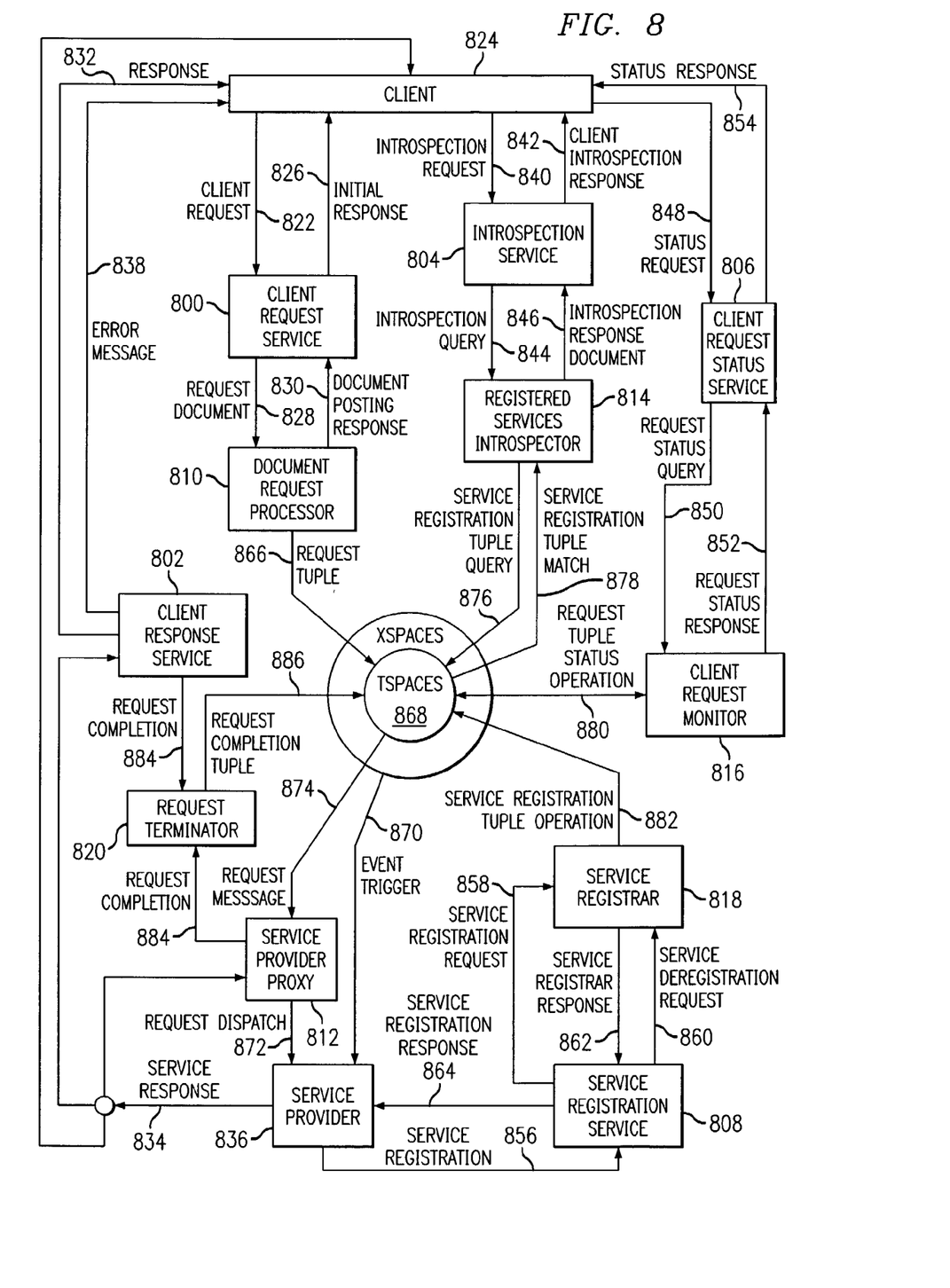
FIG. 8 is a diagram of components in an XML gateway and an XSpaces server in accordance with a preferred embodiment of the present invention.

With reference now to FIG. 8, a diagram of components in an XML gateway and an XSpaces server is depicted in accordance with a preferred embodiment of the present invention. The components of the XML gateway illustrated in FIG. 8 may be implemented in an XML gateway, such as XML gateway 600 in FIG. 6. The components of the XSpaces server may be implemented in a server, such as XSpaces 602 in FIG. 6.

In FIG. 8, the XML gateway includes client request service 800, client response service 802, introspection service 804, client request status service 806, and service registration service 808. The XSpaces server includes document request processor 810, service provider proxy 812, registered services introspector 814, client request monitor 816, service registrar 818, and request terminator 820.

With respect to the XML gateway, client request service 800 is the front end to the XML gateway. This service receives and processes incoming requests, such as client request 822 from a client, such as client 824. In these examples, client request 822 is an XML document containing data for processing. Client request 822 also may be received as a simple post of an HTML document depending on the particular implementation. Client request service 800 also responds by acknowledging or rejecting the XML document in initial response 826. In this example, initial response 826 is a synchronous response to client request 822 and takes the form of an XML document.

Client request service 800 provides an HTTP-based mechanism through which clients can post XML documents. The XML document and related information is posted to document request processor 810 in the XSpaces server using request document 828. This request document represents a raw XML document being placed into the XSpaces portion of the server. Information, such as a client IP address obtained from client request 822, also may be included in request document 828.

Client request service 800 also communicates or sends initial response 826 back to the client in response to receiving document posting response 830. This service also generates a unique reference number (reference ID) for a valid client request. The reference ID is unique to the XML gateway in these examples. Client request service 800 also authenticates the client and verifies the client has proper permissions to post a request.

In response to receiving service response 834 from service provider 836, client response service 802 sends an HTTP post message, response 832, to client 824. In these examples, response 832 contains an XML document response received in service response 834, which is received from service provider 836. In these examples, service response 834 is an XML document generated in response to processing by service provider 836. Further, client response service 802 may transcode service response 834 into the schema or format requested by client 824 identified in client request 822 to form response 832. This particular schema or format is indicated in the original client request, client request 822. Additionally, client response service 802 issues error message 838 to client 824 by an HTTP post to client 824. Situations in which an error message, such as error message 838, may be sent, include, for example, invalid access rights, invalid authorization, failure by the service provider to complete processing, or an expiration of the request. Further, client response service 802 cleans up any housekeeping (state) that is tracking the request.

At any time during the processing of the initial request, client 824 may invoke an introspection service 804 by sending introspection request 840 to introspection service 804 in the XML Gateway. In these examples, introspection request 840 may contain zero or more service introspection elements. If zero introspection elements are present, the request indicates that all available services are requested. A service introspection element, in these examples, includes an XML document type in URL form and optionally an output XML document type. The input element corresponds to the type of incoming document and may be used to pose inquiries, such as whether the XML gateway processes incoming documents of a particular type. The output type element is used to query the gateway to determine whether the response will be associated with an XML document of the specified type.

This service allows clients to introspect on the services currently registered with the XML gateway. In these examples, the introspection is in the form of an XML document that forms introspection request 840. The request is a query, defining document types on which the client is interested in introspecting or a request for a list of all the services provided.

In response to receiving this request, introspection service 804 sends introspection query 844 to registered services introspector 814, and introspection response document 846 is received. This response includes a list of matching services. Introspection response document 846 takes the form of an XML document containing pairs of document type elements in which a given pair of document types are associated with a registered service provider. The pair of document types identifies the types of XML documents which may be received as well as the formats of a response XML document.

The response to the client is formed by filtering the response from registered services introspector 814. Introspection service 804 returns client introspection response 842 to client 824. Introspection service 804 also authenticates the client and validates whether the client has access permissions to pose an introspection request to the XML Gateway. This service provides an HTTP-based mechanism by which clients can query the current services available on the XML Gateway.

Client request status service 806 provides a mechanism by which client 824 can inspect a previously posted request. This service also allows client 824 to cancel a client request. A request to this service is made by sending status request 848, which is an XML document posted to the XML gateway. If client 824 is permitted to perform this operation, status request 848 is converted into request status query 850, which is sent to client request monitor 816. Request status response 852 is returned to client request status service 806. This response is formatted into a form, status response 854, for return to client 824. Status response 854 includes results, such as that of a status operation, a cancellation operation, or an authentication failure.

Additionally, client request status service 806 also will authenticate client 824 to verify whether this client has permissions to query or cancel requests.

Service registration service 808 allows a service provider to use HTTP to register its interest in a given document type or pattern. A service provider sends service registration 856 in the form of an XML Document to service registration service 808. In response, service registration service 808 will send either service registration request 858 or service deregistration request 860 to service registrar 818 depending on whether the request is to register or deregister a service. Service registration 856 is received over a HTTP connection, and includes a service description. This service description contains input requirements, which may be used to identify when the service is to be initiated when compared to other requests, such as XML documents received by the XML gateway. Based on service registrar response 862 received from service registrar 818, service registration service 808 returns service registration response 864 to service provider 836. Service registration response 864 includes a service identifier generated by service registration service 808 in response to service registration request 858. This service ID may be used by service provider 836 to deregister the service at a later time.

In this manner, service provider 836 may register a service or remove a service from registration. This service also authenticates the service provider and verifies that the service provider has permissions to make a service registration or deregistration.

Document request processor 810 writes the XML document corresponding to the client request 822 into the XSpaces using request tuple 866. Request tuple 866 includes a context tuple, a document object model (DOM) in tuple form, a default time, and a URL. Client request 822 is an XML document, which is parsed into a DOM. Specifically, the XML document is parsed into a tuple DOM format to support an XPath-based pattern match for dispatching of service providers. In this example, request tuple 866 contains a collection of Java objects representing XML elements. This parsed information is sent in request tuple 866 to TSpaces 868. The default time is assigned to request tuple 866 after which the tuple expires and is no longer valid for use. Additionally, request tuple 866 also includes a URL to which service provider 836 should send the response. This URL may be a client URL identified in client request 822, a URL to client response service 802, or an identification that no response is required. If the URL is to a client, such as client 824, service provider 836 may respond directly to client 824 with no intermediate transformation or formatting of the result. If transformation or formatting is required of the result produced by service provider 836, the transcoding may be performed by client response service 802.

The context tuple provides an access mechanism to a state. The context tuple within request tuple 866 includes a request identifier, a client URL, and a client requested response schema.

Certain XSpaces are configured to allow an XPath-based pattern match to be the basis for the service registration, and in this case a parse is necessary. For those XSpaces that are configured to accept matches on document type only, the parse is not performed. Instead, the schema is determined using a simpler token match of the document. By default, document request processor 810 accepts all documents. Alternatively, document request processor 810 may be configured to accept a document only if a suitable service provider is present. Document request processor 810 also will format a response, such as document posting response 830.

Service provider proxy 812 is associated with backend service providers. In other words, service provider proxy 812 encapsulates the details of how XSpaces should communicate with service provider 836. In particular, service provider proxy 812 encapsulates much of the XSpaces API details with generic connectors that can speak to the other end of the connector, service provider 836. The service provider may include services configured as, for example, message queue (MQ), Customer Information Control System (CICS), Simple Object Access Protocol (SOAP), and Enterprise JavaBeans. To provide for access to different types of service providers, a myriad of different subclasses are used in which each subclass implements standard responsibilities by communicating with a specific type of service provider. Encapsulating the communications mechanism to the service provider increases the number of types of service providers that can collaborate with the XSpace and XSpaces applications.

A proxy, an instance of a class in service provider proxy 812, is created when the service, such as service provider 836, registers with service registrar 818. Based on the service provider communication type information indicated in service registration 856, a class of service provider proxy 812 is chosen and instantiated.

When service provider proxy 812 is instantiated, this proxy sets up the event callback mechanism with the TSpaces based on the document type or pattern registered by service provider 836. When client request 822, containing a document of the given type or pattern is posted into the XSpace, the callback, event trigger 870 is issued to an instance of service provider proxy 812 associated with service provider 836. In these examples, event trigger 870 includes information from request tuple 866, such as the originating XML document and the URL to which service provider 836 is to respond. This instance then sends the XML document as a request dispatch 872 to service provider 836 using whatever communication means appropriate for that instance of service provider proxy 812. Request dispatch 872 also includes any other information, such as the URL to which the response is to be sent.

Potentially, the type of service provider associated with service provider proxy 812 is unable to use HTTP to post the response document back to a URL. In this case, service provider proxy 812 is responsible for receiving service response 834 from service provider 836 and forwarding this response to the URL indicated in request tuple 866. For those service provider proxy types that are associated with HTTP capable service providers, service provider proxy 812 also is responsible for issuing request message 874 back to request terminator 820 in the XSpaces.

In summary, service provider proxy 812 is responsible for receiving a callback from TSpaces 868 in the form of event trigger 870. This callback is initiated based upon a matching request tuple found in request tuple 866 by TSpaces 868. Service provider proxy 812 dispatches the XML Document contained in the matching request to the actual service provider in request dispatch 872 using whatever communication means appropriate for that kind of service provider. For those service providers who cannot use HTTP to post responses, service response 834 is received by service provider proxy 812 and formatted into an XML document if not already in that form. This result is posted to the URL indicated in event trigger 870. For those service providers who respond directly to the client, service provider proxy 812 cleans up the state information associated with the request. This clean up is performed by sending request message 874 to request terminator 820.

Registered services introspector 814 is responsible for implementing the introspection mechanism on services registered with the XSpaces. Introspection query 844 is posted to the XSpaces. Registered services introspector 814 converts this query into a tuple operation, service registration tuple query 876, which can be matched against the service registration tuples in TSpaces 868. The result of this tuple query is the set of service registration tuples that match the query. These tuples are returned in service registration tuple match 878. This set is filtered to remove those services that were marked as not introspectable. Registered services introspector 814 creates an XML document from the contents of service registration tuple match 878. The contents of service registration tuple match 878 are filtered to contain only those services for which the client has permissions. This document is returned as introspection response document 846.

Client request monitor 816 provides support in querying and deletion of state tuples in the XSpace associated with client request 822, which is formatted into request tuple 866 and sent to TSpaces 868. Request status query 850 in the form of an XML document is received by client request monitor 816 from client request status service 806. The request is converted into the appropriate tuple operation (read or delete) and this operation is made on TSpaces 868 using request tuple status operation 880. The result of this operation is received by client request monitor 816 from TSpaces 868 with this result being formatted into an XML Document and returned as request status response 852. Client request monitor 816 also collaborates with TSpaces 868 to detect and remove any stale request tuples, such as request tuple 866.

Service registrar 818 receives service registration request 858 to instantiate an appropriate type of service provider proxy from service provider proxy 812 for the type of service provider being registered. The service provider proxy instance instantiated is the target object for the event registration that is posted into TSpaces 868 using service registration tuple operation 882.

Service registrar 818 also provides a mechanism by which a service provider, such as service provider 836, can deregister from the XSpace by receiving service deregistration request 860 from service registration service 808. In this case, service registrar 818 terminates the instance of service provider proxy 812 associated with service provider 836 and removes the corresponding service registration tuple.

Additionally, service registrar 818 completes the service registration in TSpaces 868 by setting up the event mechanism and details of the service registration required by registered services introspector 814. Further, service registrar 818 generates a unique serviceID, unique to the XSpaces.

Request terminator 820 is an XSpace component, which provides a mechanism by which the request can be marked as completed (i.e. terminated as far as the XSpace is concerned) by the service provider completing its response. Request termination is signaled by request completion 884, which is received from service provider 836 in this example. In response to receiving this request, request completion tuple 886 is sent to TSpaces 868 to remove request tuple 866 from TSpaces 868. In other words, the state associated with the client request for a given reference identification is removed from TSpaces 868 to remove or clean up state information. The result of this request is a removal from the TSpace along with any other state information stored in the XSpace associated with client request 822. Request terminator 820 also may be invoked by client response service 802. Basically, request terminator 820 converts request completion 884 into a removal of state information about client request 822, which is stored in the XSpace. This converted message is sent to TSpaces 868 as request completion tuple 886.

Figure 9:
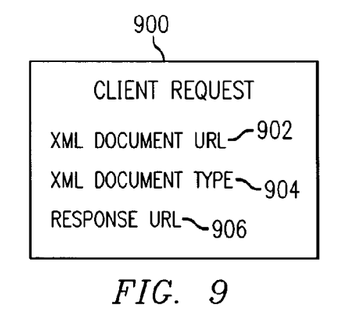
FIG. 9 is a diagram of a client request in accordance with a preferred embodiment of the present invention.

Turning next to FIG. 9, a diagram of a client request is depicted in accordance with a preferred embodiment of the present invention. Client request 900 is an example of a format, which may be implemented as client request 822 in FIG. 8.

Client request 900 is an XML document in these examples. This request includes XML document URL 902, which is a URL to the XML document containing data to be processed. Additionally, XML document type 904 is identified in client request 900. XML document type 904 identifies the type of XML document that is expected as a response to client request 900. Response URL 906 also is contained in client request 900. This response URL may be a valid URL to a HTTP server. Alternatively, a null value may be included for this response URL to indicate that the response is expected as a synchronous response to the HTTP post of client request 900. If the response URL is identified as "NONE" then no response is expected or will be processed by the client.

Figure 10:
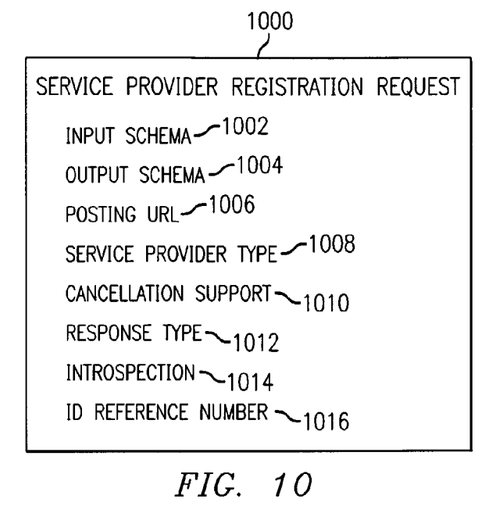
FIG. 10 is a diagram of a service provider registration request in accordance with a preferred embodiment of the present invention.

With reference now to FIG. 10, a diagram of a service provider registration request is depicted in accordance with a preferred embodiment of the present invention. Service provider registration request 1000 may be implemented as service registration 856 in FIG. 8. Service provider registration request 1000 is an example of information that is included in registering services, such as those provided by service provider 836 in FIG. 8 with an XML gateway. This format also defines the mechanism by which a service provider may deregister a service from the XML gateway.

In these examples, service provider registration request 1000 includes input schema 1002 and output schema 1004. Input schema 1002 is used to indicate a service provider's ability to process XML documents of a given type. Optionally, an XPath-based definition of a pattern of values that the input request must also contain to invoke the service, may be included. Output schema 1004 identifies the type of XML document that is used in the response returned by the service provider. Posting URL 1006 in service provider registration request 1000 identifies the URL to which the requested XML document received from the client should be posted. Service provider type 1008 identifies the type of service provider. This information may be used to determine the type of service provider proxy to associate with the service provider.

Cancellation support 1010 provides an indication of whether the service provider supports a cancellation or rollback of a request from a client. Response type 1012 identifies whether the response is synchronous or asynchronous. A synchronous response is a direct and immediate response on to the HTTP POST request. An asynchronous response happens when the XML Gateway sends an HTTP POST request to the client at some later time. Introspection 1014, in service provider registration request 1000, indicates whether the service is introspectable. ID reference number 1016 is included if the request is a deregistration request, with this number being used to identify a service that is to be deregistered.

Figure 11:
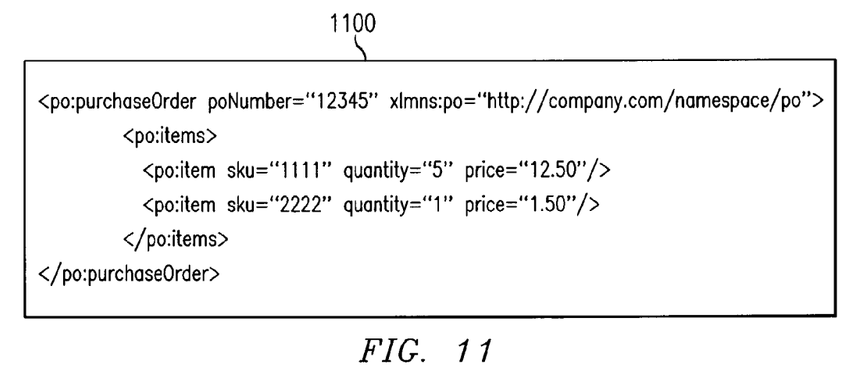
FIG. 11 is an example of an XML document in accordance with a preferred embodiment of the present invention.

Elements identified in the XML document through parsing of the document include a set of tuples, as described above, to identify or generate the document state. The parsing is used to transform the document into a set of tuples. Turning to FIG. 11, an example of an XML document is depicted in accordance with a preferred embodiment of the present invention. XML document 1100 contains tuples, which are identified through parsing of XML document 1100.

Figure 12:
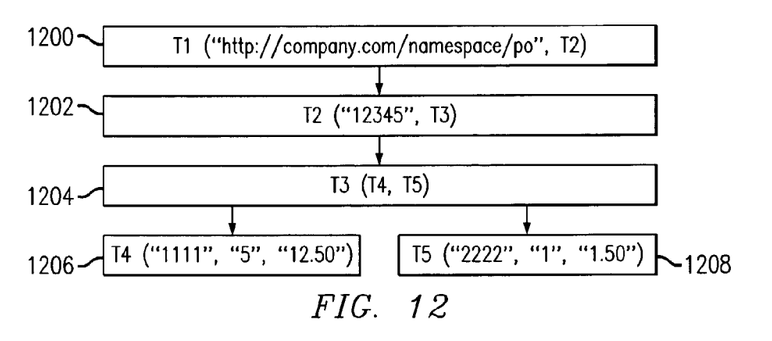
FIG. 12 is a diagram illustrating tuples generated from parsing of the XML document in accordance with a preferred embodiment of the present invention.

Next, with reference to FIG. 12, a diagram illustrating tuples generated from parsing of the XML document are depicted in accordance with a preferred embodiment of the present invention. In this example, parsing of XMl document 1100 generates tuples 1200, 1202, 1204, 1206, and 1208. Each tuple contains a label in the form of "Tn", which represents an internal tuple reference, such as that used in pointer structures. These tuples are the ones that form the state of a document and are used to identify services or service providers that may be used through a tuple pattern match process as described above. Further, changes to the state of the document are identified by matching tuple patterns.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing processing of a document, the method comprising:

identifying a set of services registered for use in processing a document received from a client, wherein registration information for each service within the set of services provides input requirements;

selecting a service from the set of registered services to form a selected service by comparing a current state of the document with the input requirements for each service within the set of registered services;

initiating execution of the selected service on the document, wherein a state transition occurs to a new state, which becomes the current state of the document;

repeating the selecting step and the initiating step until a response is returned to the client; and responsive to a request to register a new service, dynamically altering the set of registered services provided for processing of the document to include the new service.

2. The method of claim 1 further comprising:

responsive to a request to remove an existing service from the set of registered services, dynamically altering the set of registered services provided for processing the document to remove the existing service.

3. A method in a data processing system for handling a request, the method comprising:
receiving a document from a client;
parsing the document to identify a state of the document;
selecting a registered service from a set of registered services based on the state of the document to form a selected registered service;
initiating the selected registered service to process the document, wherein the document is altered;
repeating the selecting and initiating steps until the document has a selected state; and
returning the document having the selected state to the client;
wherein the state of the document includes data from the document and wherein the selecting step comprises:
selecting a registered service from a set of registered services based on the state of the document to form a selected registered service by comparing input requirements for each of the registered services with the data.

4. The method of claim 3, wherein the document is a markup language document.

5. The method of claim 4, wherein the markup language document is an extensible markup language document.

6. The method of claim 3, wherein the client is at least one of a process on the data processing system, a computer in communication with the data processing system, and a personal digital assistant.

7. The method of claim 3 further comprising:
receiving a request to register a service; and
registering the service in response to receiving the request to form a new registered service, wherein the new registered service becomes part of the set of registered services.

8. The method of claim 3, further comprising: receiving a request to unregister the registered service; and
unregistering the registered service in response to receiving the request to form an unregistered service, wherein the unregistered service is absent from the set of registered services and is unselectable by the selecting set.

9. The method of claim 3, wherein the set of registered services includes business logic.

10. The method of claim 3, wherein the document is altered by the selected registered service returning a new document in place of the document received from the client.

11. A method in a data processing system for processing an extensible markup language document, the method comprising:
receiving the extensible markup language document from a client;
identifying a state of the extensible markup language document;
determining whether the state corresponds to a service registered with the data processing system;
responsive to the state corresponding to a service, calling the service, wherein the service executes a process and alters the extensible markup language document to form an altered extensible markup language document;
identifying a second state of the altered extensible markup language document;
determining whether the second state corresponds to another service registered with the data processing system;
calling the another service, responsive to the second state corresponding to another service, wherein the another service executes a process and alters the altered extensible markup language document to form a second altered extensible markup language document; and
returning the second altered extensible markup language document to the client.

12. The method of claim 11, wherein the state is a first state and further comprising:
identifying a second state of the altered extensible markup language document;
determining whether the second state corresponds to another service registered with the data processing system; and
responsive to the second state corresponding to another service, calling the another service, wherein the another service executes a process and alters the altered extensible markup language document which is returned to the client as the altered extensible markup language document.

13. The method of claim 12, further comprising:
repeating the identifying, determining, and calling steps without initiating the returning step until a state is identified in which the altered extensible markup language document is to be returned to the client.

14. The method of claim 11, wherein the state includes data from the extensible markup language document.

15. A data processing system for managing processing of a document, the data processing system comprising:
a bus system;
a communications unit connected to the bus system;
a memory connected to the bus system, wherein the memory includes a set of instructions; and
a processing unit connected to the bus system, wherein the processing unit executes the set of instructions to identify a set of services registered for use in processing a document received from a client in which registration information for each service within the set of services provides input requirements; select a service from the set of registered services to form a selected service by comparing a current state of the document with the input requirements for each service within the set of registered services; initiate execution of the selected service on the document in which a state transition occurs to a new state, which becomes the current state of the document; repeat instructions to select and the initiate until a response is returned to the client; and dynamically alter the set of registered services provided for processing of the document to include the new service in response to a request to register a new service.

16. A data processing system for handling a request, the data processing system comprising:
a bus system;
a communications unit connected to the bus system;
a memory connected to the bus system, wherein the memory includes a set of instructions;
a processing unit connected to the bus system, wherein the processing unit executes the set of instructions to receive a document from a client;
parse the document to identify a state of the document;
select a registered service from a set of registered services based on the state of the document to form a selected registered service;
initiate the selected registered service to process the document in which the document is altered;
repeat the instructions to select and initiate until the document has a selected state;
return the document having the selected state to the client;

wherein the state of the document includes data from the document and wherein the select instructions comprises:
select a registered service from a set of registered services based on the state of the document to form a selected registered service by comparing input requirements for each of the registered services with the data.

17. A data processing system for processing an extensible markup language document, the data processing system comprising:
a bus system;
a communications unit connected to the bus system;
a memory connected to the bus system, wherein the memory includes a set of instructions;
a processing unit connected to the bus system, wherein the processing unit executes the set of instructions to receive the extensible markup language document from a client;
identify a state of the extensible markup language document;
determine whether the state corresponds to a service registered with the data processing system;
call the service in which the service executes a process and alters the extensible markup language document to form an altered extensible markup language document in response to the state corresponding to a service;
identify a second state of the altered extensible markup language document;
determine whether the second state corresponds to another service registered with the data processing system;
call the another service, responsive to the second state corresponding to another service, wherein the another service executes a process and alters the altered extensible markup language document to form a second altered extensible markup language document; and
return the second altered extensible markup language document to the client.

18. A data processing system for managing processing of a document, the data processing system comprising:
identifying means for identifying a set of services registered for use in processing a document received from a client, wherein registration information for each service within the set of services provides input requirements;
selecting means for selecting a service from the set of registered services to form a selected service by comparing a current state of the document with the input requirements for each service within the set of registered services;
initiating means for initiating execution of the selected service on the document, wherein a state transition occurs to a new state, which becomes the current state of the document;
repeating means for repeating instructions of the selecting means and the initiating means until a response is returned to the client; and
altering moans, responsive to a request to resister a new service, for dynamically altering the set of registered services provided for processing of the document to include the new service.

19. The data processing system of claim 18, wherein the altering means is a first altering means, further comprising:
second altering means, responsive to a request to remove an existing service from the set of registered services, for dynamically altering the set of registered services provided for processing the document to remove the existing service.

20. A data processing for handling a request, the data processing system comprising:
receiving means for receiving a document from a client;
parsing means for parsing the document to identify a state of the document;
selecting means for selecting a registered service from a set of registered services based on the state of the document to form a selected registered service;
initiating means for initiating the selected registered service to process the document, wherein the document is altered;
repeating means for repeating the initiation of the selecting means and initiating means until the document has a selected state; and
returning means for returning the document having the selected state to the client;
wherein the state of the document includes data from the document and wherein the selecting means comprises:
means for selecting a registered service from a set of registered services based on the state of the document to form a selected registered service by comparing input requirements for each of the registered services with the data.

21. The data processing system of claim 20, wherein the document is a markup language document.

22. The data processing system of claim 21, wherein the markup language document is an extensible markup language document.

23. The data processing system at claim 20, wherein the client is at least one of a process on the data processing system, a computer in communication with the data processing system, and a personal digital assistant.

24. The data processing system of claim 20, wherein the receiving means is a first receiving means, further comprising:
second receiving means for receiving a request to register a service; and
registering means for registering the service in response to receiving the request to form a new registered service, wherein the new registered service becomes part of the set of registered services.

25. The data processing system of claim 20, wherein the receiving means is a first receiving means, further comprising:
second receiving means far receiving a request to unregistor the registered service; and
unregistering means for unregistering the registered service in response to receiving the request to form an unregistered service, wherein the unregistered service is absent from the set of registered services and is unselectable by the selecting set.

26. The data processing system of claim 20, wherein the set of registered services includes business logic.

27. The data processing system of claim 20, wherein the document is altered by the selected registered service returning a new document in place of the document received from the client.

28. A data processing system for processing an extensible markup language document, the data processing system comprising:
receiving means for receiving the extensible markup language document from a client;
identifying means for identifying a state of the extensible markup language document;

determining means for determining whether the state corresponds to a service registered with the data processing system;

calling means, responsive to the state corresponding to a service, for calling the service, wherein the service executes a process and alters the extensible markup language document to form an altered extensible markup language document;

identifying means for identifying a second state of the altered extensible markup language document;

determining means for determining whether the second state corresponds to another service registered with the data processing system;

calling means for calling the another service, responsive to the second state corresponding to another service, wherein the another service executes a process and alters the altered extensible markup language document to form a second altered extensible markup language document; and returning means for returning the second altered extensible markup language document to the client.

29. The data processing system of claim 28, wherein the identifying means is a first identifying means, the determining means is a first determining means, and the calling means is a first calling means, wherein the state is a first stare and further comprising:

second identifying means for identifying a second state of the altered extensible markup language document;

second determining means for determining whether the second state corresponds to another service registered with the data processing system; and second calling means, responsive to the second state corresponding to another service, for calling the another service, wherein the another service executes a process and alters the altered extensible markup language document.

30. The data processing system of claim 29 further comprising:

repeating means for repeating initiation of the identifying means, determining means, and calling means without initiating the returning means until a state is identified in which the altered extensible markup language document is to be returned to the client.

31. The data processing system of claim 28, wherein the state includes data from the extensible markup language document.

32. A computer program product embedded in a computer readable storage medium for managing processing of a document, the computer program product comprising:

first instructions for identifying a set of services registered for use in processing a document received from a client, wherein registration information for each service within the set of services provides input requirements;

second instructions for selecting a service from the set of registered services to form a selected service by comparing a current state of the document with the input requirements for each service within the set of registered services;

third instructions for initiating execution of the selected service on the document, wherein a state transition occurs to a new state, which becomes the current state of the document;

fourth instructions for repeating the second instructions and the third instructions until a response is returned to the client; and fifth instructions, responsive to a request to register a new service, for dynamically altering the set of registered services provided for processing of the document to include the new service.

33. A computer program product embedded in a computer readable storage medium for handling a request, the computer program product comprising:

first instructions for receiving a document from a client;

second instructions for parsing the document to identify a state of the document;

third instructions for selecting a registered service from a set of registered services based on the state of the document to form a selected registered service;

fourth instructions for initiating the selected registered service to process the document, wherein the document is altered;

fifth instructions for repeating the third and fourth instructions until the document has a selected state; and sixth instructions for returning the document having the selected state to the client;

wherein the state of the document includes data from the document and wherein the third instructions for selecting comprises:

instructions for selecting a registered service from a set of registered services based on the state of the document to form a selected registered service by comparing input requirements for each of the registered services with the data.

34. A computer program product embedded in a computer readable storage medium for processing an extensible markup language document, the computer program product comprising:

first instructions for receiving the extensible markup language document from a client;

second instructions for identifying a state of the extensible markup language document;

third instructions for determining whether the state corresponds to a service registered with the data processing system;

fourth instructions, responsive to the state corresponding to a service, for calling the service, wherein the service executes a process and alters the extensible markup language document to form an altered extensible markup language document;

fifth instructions for identifying a second state of the altered extensible markup language document;

sixth instruction for determining whether the second state corresponds to another service registered with the data processing system;

seventh instructions for calling the another service responsive to the second state corresponding to another service, wherein the another service executes a process and alters the altered extensible markup language document to form a second altered extensible markup language document; and eighth instructions for returning the second altered extensible markup language document to the client.

* * * * *

UNITED STATES PATENT AND TRADEMARK OFFICE
CERTIFICATE OF CORRECTION

PATENT NO.        : 7,107,333 B2                                                   Page 1 of 1
APPLICATION NO.  : 10/202175
DATED             : September 12, 2006
INVENTOR(S)       : Burbeck et al.

It is certified that error appears in the above-identified patent and that said Letters Patent is hereby corrected as shown below:

Col. 17, line 60: after "altering" delete "moans" and insert --means--.

Col. 18, line 4: after "processing" insert --system--.

Signed and Sealed this

Nineteenth Day of December, 2006

JON W. DUDAS
*Director of the United States Patent and Trademark Office*